Jan. 2, 1962   J. F. OLES   3,015,224
LINT FILTER
Filed May 27, 1960   3 Sheets-Sheet 1

FIG·1

*INVENTOR.*
JOSEPH F. OLES
BY
ATTORNEY

Jan. 2, 1962   J. F. OLES   3,015,224
LINT FILTER

Filed May 27, 1960   3 Sheets-Sheet 2

INVENTOR.
JOSEPH F. OLES
BY  *J. P. Keiper*
ATTORNEY

Jan. 2, 1962

J. F. OLES
LINT FILTER 3,015,224

Filed May 27, 1960

*INVENTOR.*
JOSEPH F. OLES

BY *f. P. Keifer*

ATTORNEY

United States Patent Office 3,015,224
Patented Jan. 2, 1962

3,015,224
LINT FILTER
Joseph F. Oles, Cincinnati, Ohio, assignor to The Murray Corporation of America, Syracuse, N.Y., a corporation of Delaware
Filed May 27, 1960, Ser. No. 32,429
11 Claims. (Cl. 68—18)

This invention relates to washing machines, and more particularly to an agitator actuated lint filter therefor.

In washing machines of the type having an oscillating vertical axis agitator located in a tub, it has been proposed to continuously recirculate the tub wash water during washing through a lint screen. Such recirculation requires a pump, and conduits for withdrawing and redelivering the wash water to the tub, and a lint filter interposed in the conduit line.

It is desirable in such a system to locate the lint filter in a readily accessible position so that it can be easily cleaned at frequent intervals. While in any event, such a system requires a lint filter the provision of conduits and a pump for recirculation is an added expense.

The present invention is directed to a lint filter which derives its recirculation from the action of the oscillating motion of the agitator, without requiring external recirculating conduits and pumping means. The invention is especially applicable for use in conjunction with an agitator of the spiral bladed type which during one half of each oscillation produces a powerful upward surge of the wash water adjacent to the agitator column. The invention comprises an annular filter cup having a filter screen, adapted to be mounted on the agitator column in a manner whereby the upward surge caused by the oscillating agitator causes flow into the cup, and discharge therefrom through the screen, the filtering continuing so long as the agitator is in motion.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts,

FIGURE 4 is a sectional development of the filter as viewed from the arcuate section line 4—4 of FIG. 2; and FIGURE 5 is a sectional view taken through the filter at the line 5—5 of FIG. 4.

Figure 1:
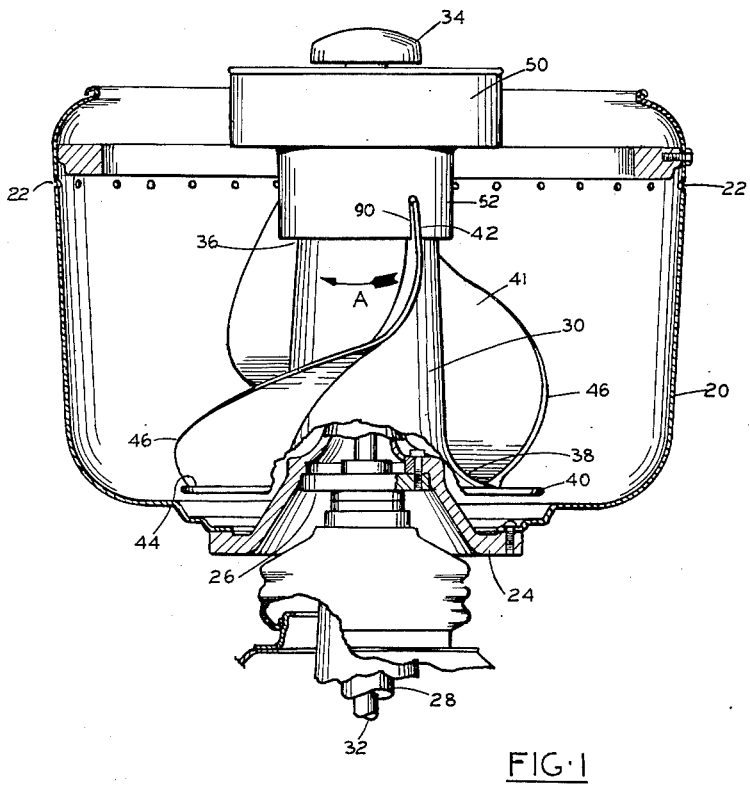
FIGURE 1 is a vertical sectional view through a centrifugal extractor wash tub showing the agitator and filter mounted therein.
Figure 2:
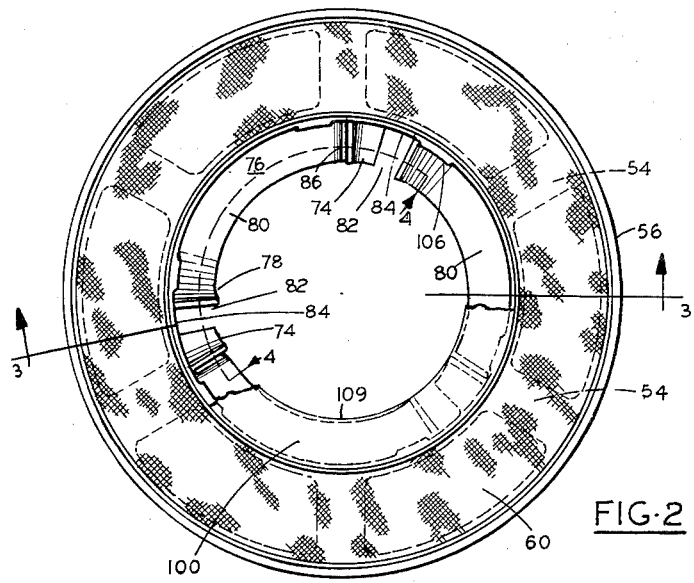
FIGURE 2 is a plan view of the filter, with portions broken away.

In FIGURE 1, there is shown a centrifugal extraction tub 20, having overflow apertures 22 to establish a water level in the tub during washing. The tub is mounted on an annular plate 24, secured to the flange 26 of the hollow drive shaft 28, which extends to a transmission, not shown, such as that disclosed in Flannery Patent 2,976,-746 issued March 28, 1961, the drive shaft being adapted to rotate the tub for centrifugal extraction during a part of the wash cycle.

Within the tub is an oscillating agitator 30 secured to the drive shaft 32, which also extends into the transmission. As is understood in the art, during washing, the agitator is oscillated through an angle of about 200 degrees, at a rate of about 60 oscillations per minute. The agitator 30 is secured to the drive shaft 32 by a cap screw 34. The agitator comprises a hollow column, having a slight tapered portion at its upper end, as at 36, the column flaring at the bottom as at 38 to form the bottom skirt flange 40. The agitator has three blades 41 which increase in radial width from top to bottom. Each of the blades, at its upper end extends nearly vertical as at 42, and at its lower end the blade widens and extends spirally around the agitator column, terminating in the skirt flange 40 as at 44. The lower portion of each blade extends outwardly beyond the skirt flange periphery, as at 46.

During the rotational portion of each cycle of movement of the agitator while it is rotating in the direction of arrow A, the blades tend to lift the water around the agitator column, producing an upsurge immediately around the column. In order to employ this upsurge to effect continuous filtration, during agitator oscillation, there is mounted upon the upper end of the agitator column, a hollow annular filter unit indicated at 50.

The filter unit may comprise a unitary annulus, having an annular skirt portion 52 radially spaced from the agitator column, and an external annular screen supporting grid work composed of spaced radial arms 54, surrounded by an external annular cup wall 56. The grid work 54 supports an annular screen of wire mesh or perforate sheet material such as stainless steel or other corrosion resistant material, preferably, the screen 58 having a multiplicity of lint filtering perforations 60, disposed over substantially its entire surface. The filter screen may be supported upon annular shoulders 62 and 64, which may have annular grooves 66 and 68 to receive depending flanges 70 and 72 on the inner end and outer edges of the screen 58.

Within the skirt 52, are a pair of ribs 74 and 76, between each pair of agitator blades. The ribs 74 and 76 extend radially inward to engage the agitator column wall. The rib 74 extends substantially vertical. The rib 76 has an upper vertical portion 78, and a substantially horizontal lower portion 80 joined by a intermediate curved portion 81. The upper portion 78 of the rib 76 is circumferentially spaced from the rib 74 to provide an upward passage 82 leading to a weir 84 in the upper end of the skirt 52, over which wash water passing up through the passage 82 may spill over upon the annular screen 58.

The horizontal portion 80 of the rib extends towards the rib 76 of the adjacent pair of ribs 74 and 76, and has a downwardly extending portion 86, spaced from the adjacent rib 74. The spacing is such as to embrace the upper end of an agitator blade. Since the width of the agitator blade gradually increases to a degree greater than the radial spacing of the lower portion of the skirt 52 from the column wall, the skirt is provided with a slot 90, disposed between the adjacent portion 86 of rib 76, and the adjacent rib 74.

It will be seen that the horizontal portion 80 of each rib 76 forms a downwardly facing pocket 92, to receive the upsurge of water along the agitator column, each time the agitator moves in the direction of arrow A. The upsurge is channelled between each pair of ribs so as to flow upward in the passage 82 formed by the inside skirt wall, the agitator column wall and the ribs 74 and 76 of each pair. The wash water, thus channelled is caused to spill over the weirs 84, to discharge on the screen 58. The oscillating motion of the screen causes a circumferential washing action across the screen, while the water filters through the screen to return to the wash tub, leaving the lint on the screen.

An annular cover member 100 is secured to the upper end of the skirt, the cover member extending to the agitator column, and closing off the upper ends of each of the passages 82, above the weirs 84, thus providing open windows 102 above each weir for the free flow radially outward of wash water surging upward in the passages 82.

The cover member may have an angular offset in its periphery as at 104, and one or more tongues 106 on the inner wall of the skirt immediately adjacent the upper edge thereof may project into corresponding recesses 108 in the cover member, to secure the cover member to the skirt. The inner annular edge 109 of the cover member may rest upon the arcuate beading 110 formed on the agitator column, the beading being interrupted as at 111 to permit the ribs 74 and 76 to slide into place into a close contact with the column wall, when the filter unit is placed upon the agitator column. The taper of the agitator column is such that the horizontal and lower portions of the ribs 76 clear the arcuate beading, when removing or applying the filter unit to the agitator. The arcuate beading engaging the underside of the annular cover, locates the unit correctly upon the agitator and prevents wedging of the inner edges of ribs 74 and 76 against the column wall, which would render removal of the unit difficult. It will be understood that the ribs 74 and 76 make a close substantially leak tight fit with the agitator column wall, without necessity of any wedging.

Figure 3:
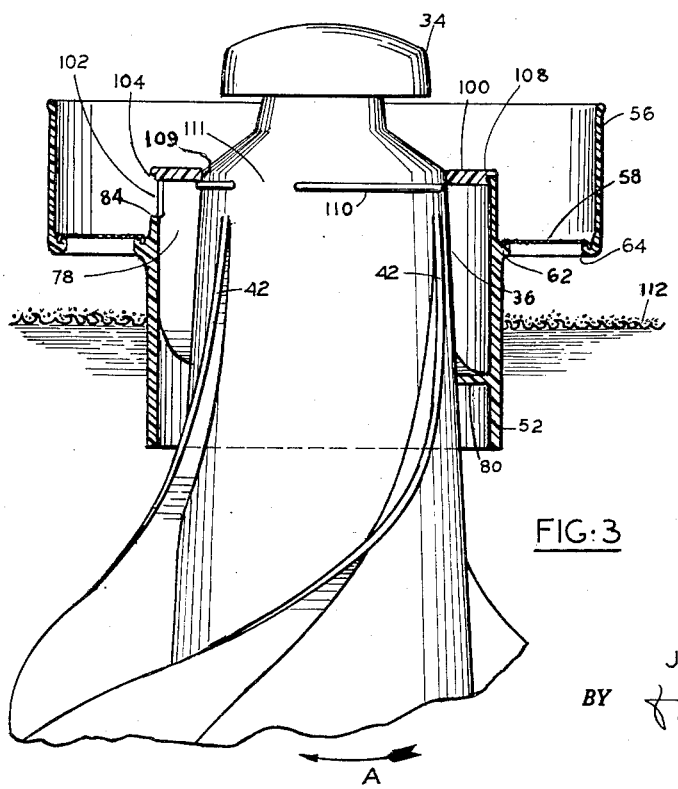
FIGURE 3 is an enlarged section view of the filter taken substantially on the broken line 3—3 of FIG. 2.

In FIG. 3, the approximate static wash water level is indicated at 112, which level is set by the over flow ports 22. It can readily be seen that as the agitator oscillates, the level adjacent the agitator column lowers and raises producing the upsurge, resulting in the continuous filtration. The upsurge is amplified by the shape of the passages formed by the ribs 76.

While the invention has been described in connection with an agitator of the spiral bladed type, which agitator provides a pronounced upsurge, during oscillations of 60 or more per minute, agitators with straight blades may likewise create upsurges less pronounced, the degree of which may depend upon the frequency of oscillation, and the extent of dwell during reversal of angular movement. While such upsurges may be of lesser amplitude, the frequency thereof may be doubled, because of the symmetry of the blades.

During the course of a ten or fifteen minute wash period, the wash water is continuously filtered, the lint collecting on the screen whence it may be removed before the start of the next wash load.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A washing machine lint filter comprising a tubular sleeve adapted to be mounted upon the upper end of and in radial spaced relation to the column of an oscillating bladed agitator, said sleeve being of a length to extend below the wash water level and having lengthwise extending internal ribs adapted to engage and form with an agitator column, upwardly extending passages, an annular cup having a lint screen forming a lower wall thereof disposed around the upper end of said sleeve, and ports in said sleeve above the lint screen communicating with said passages.

2. A washing machine lint filter comprising a tubular sleeve adapted to be mounted upon the upper end of and in radial spaced relation to the column of an oscillating bladed agitator, said sleeve being of a length to extend below the wash water level and having lengthwise extending internal ribs adapted to engage and form with an agitator column, upwardly extending passages, an annular cup having a lint screen forming a lower wall thereof disposed around the upper end of said sleeve, ports in said sleeve above the lint screen communicating with said passages, and means for locating said sleeve upon an agitator in a fixed position axially thereof.

3. A washing machine lint filter comprising a tubular sleeve adapted to be mounted upon the upper end of and in radial spaced relation to the column of an oscillating bladed agitator, said sleeve being of a length to extend below the wash water level and having lengthwise extending internal ribs adapted to engage and form with an agitator column, upwardly extending passages, an annular cup having a lint screen forming a lower wall thereof disposed around the upper end of said sleeve, ports in said sleeve above the lint screen communicating with said passages, and means adapted to co-act with an agitator blade to cause the sleeve to oscillate with the agitator.

4. A washing machine lint filter comprising a tubular sleeve adapted to be mounted upon the upper end of and in radial spaced relation to the column of an oscillating bladed agitator, said sleeve being of a length to extend below the wash water level and having lengthwise extending internal ribs adapted to engage and form with an agitator column, upwardly extending passages, an annular cup having a lint screen forming a lower wall thereof disposed around the upper end of said sleeve, and ports in said sleeve above the lint screen communicating with said passages, and means for locating said sleeve upon agitator in a fixed position axially thereof, and means adapted to co-act with an agitator blade to cause the sleeve to oscillate with the agitator.

5. A lint filter adapted to be mounted upon the upper end of the central column of an oscillating bladed washing machine agitator which comprises an annular skirt having internal inwardly and upwardly extending ribs adapted to engage with and form channels along and radially space the skirt from an agitator column, said skirt being of a length to extend above and below the normal wash water level in which the agitator operates, an annular cup disposed around the upper end of said skirt having a lint filter screen perforate lower wall, and ports in the skirt wall, above said screen, communicating with the rib formed channels.

6. A washing machine lint filter adapted to be mounted upon a bladed oscillating agitator having a central column comprising an annular cup having inner and outer annular walls, a lint screen perforate bottom adapted to be disposed above the wash tub water level, and annular skirt means extending downwardly from the inside wall of the cup and adapted to extend below the wash tub water level and internal ribs formed along the inside wall of said skirt adapted to cooperate with the central column of an agitator to form an upwardly extending channel, and an aperture in the inner wall of said cup communicating with the rib formed channel.

7. A washing machine lint filter comprising in combination, a tub having means for establishing a wash water level, a bladed agitator mounted in the tub on a vertical axis, said agitator having a central column, means for oscillating the agitator, an annular cup having a perforate lint screen bottom disposed above the wash tub water level and mounted on the agitator column in spaced relation thereto, and means disposed between the column and cup and extending below the cup and the wash tub water level for conducting wash water upsurging along and exteriorly of the column, into the cup in response to agitator oscillation.

8. A washing machine lint filter comprising in combination, a tub having means for establishing a wash water level, an agitator mounted in the tub on a vertical axis, said agitator having a central column and a spiral blade thereon, means for oscillating the agitator, an annular cup having a perforate lint screen bottom disposed above the wash tub water level and mounted on the agitator column in spaced relation thereto, and means disposed between the column and cup and extending below the cup and the wash tub water level for conducting wash water upsurging along and exteriorly of the column into the cup, in response to agitator oscillation.

9. A washing machine lint filter comprising in combination, a tub having means for establishing a wash water level, an agitator mounted in the tub on a vertical axis, said agitator having a central column and a spiral blade thereon, means for oscillating the agitator, an annular cup having a perforate lint screen bottom disposed above the wash tub water level and mounted on the agitator column in spaced relation thereto, and means comprising an annular skirt spaced from the column and extending from the cup and below the wash tub water level for conducting wash water upsurging along and exteriorly of the column, into the cup in response to agitator oscillation.

10. A washing machine lint filter comprising in combination, a tub having means for establishing a wash water level, an agitator mounted in the tub on a vertical axis, said agitator having a central column, and a plurality of spiral blades thereon, means for oscillating the agitator, an annular cup having an annular perforate bottom adapted to screen lint, said cup being mounted on the agitator column, in radial spaced relation thereto above the water level, and having inner and outer upstanding annular walls, the inner wall extending below the cup and below the wash water level, and having radially inwardly extending ribs, corresponding in number to the number of agitator blades, extending from bottom to top and adapted to engage the agitator column from bottom to top, said inner wall having additional radially inward extending ribs forming with the first named ribs and the agitator column upwardly extending passages for receiving wash water upsurges along the agitator column on oscillation of said agitator, and ports in the inner side wall of said cup, above the bottom thereof communicating with each of said passages.

11. A washing machine lint filter comprising a tubular sleeve adapted to be mounted upon the upper end of and in radial spaced relation to the column of an oscillating bladed agitator, said sleeve being of a length to extend below the wash water level and having means including lengthwise extending internal ribs adapted to form upwardly extending channels within the sleeve, an annular cup having a lower perforate wall in the form of a lint screen disposed around the upper end of said sleeve, and ports in said sleeve above the lint screen communicating with said passages.

References Cited in the file of this patent
UNITED STATES PATENTS

| | | |
|---|---|---|
| 1,923,580 | Nelson | Aug. 22, 1933 |
| 2,909,051 | Altorfer | Oct. 20, 1959 |